United States Patent
Fred et al.

(10) Patent No.: US 10,351,428 B2
(45) Date of Patent: Jul. 16, 2019

(54) METHOD OF PHOSPHORUS REMOVAL AND RECOVERY

(71) Applicant: HSY Helsingin seudun ympäristöpalvelut-kuntayhtymä, Helsinki (FI)

(72) Inventors: Tommi Fred, Helsinki (FI); Mari Heinonen, Vantaa (FI); Paula Lindell, Vantaa (FI); Sini Reuna, Jyväskylä (FI)

(73) Assignee: HSY HELSINGIN SEUDUN YMPÄRISTÖPALVELUT-KUNTAYHTYMÄ, Helsinki (FI)

( * ) Notice: Subject to any disclaimer, the term of this patent is extended or adjusted under 35 U.S.C. 154(b) by 75 days.

(21) Appl. No.: 15/467,186

(22) Filed: Mar. 23, 2017

(65) Prior Publication Data

US 2017/0275167 A1    Sep. 28, 2017

(30) Foreign Application Priority Data

Mar. 24, 2016 (EP) .................................... 16162274

(51) Int. Cl.

| | | |
|---|---|---|
| C01B 25/18 | (2006.01) |
| C01B 25/28 | (2006.01) |
| C02F 1/00 | (2006.01) |
| C02F 1/24 | (2006.01) |
| C02F 1/52 | (2006.01) |
| C02F 1/66 | (2006.01) |
| C02F 1/20 | (2006.01) |
| C02F 1/42 | (2006.01) |
| C02F 3/12 | (2006.01) |
| B01J 39/05 | (2017.01) |
| B01J 49/53 | (2017.01) |
| C02F 101/10 | (2006.01) |
| C02F 101/16 | (2006.01) |

(52) U.S. Cl.
CPC .............. *C01B 25/185* (2013.01); *B01J 39/05* (2017.01); *B01J 49/53* (2017.01); *C01B 25/28* (2013.01); *C02F 1/001* (2013.01); *C02F 1/20* (2013.01); *C02F 1/24* (2013.01); *C02F 1/42* (2013.01); *C02F 1/5236* (2013.01); *C02F 1/5245* (2013.01); *C02F 1/66* (2013.01); *C02F 3/1215* (2013.01); *C02F 1/004* (2013.01); *C02F 2001/007* (2013.01); *C02F 2101/105* (2013.01); *C02F 2101/16* (2013.01); *C02F 2209/02* (2013.01); *C02F 2301/046* (2013.01); *C02F 2303/16* (2013.01); *Y02W 10/15* (2015.05)

(58) Field of Classification Search
CPC .................................................... C01B 25/185
See application file for complete search history.

(56) References Cited

U.S. PATENT DOCUMENTS

| | | | |
|---|---|---|---|
| 4,171,342 A | 10/1979 | Hirko et al. | |
| 4,565,680 A | 1/1986 | Todd et al. | |
| 7,560,031 B1 * | 7/2009 | Astley ..................... | C02F 1/441 |
| | | | 210/710 |
| 2009/0206028 A1 | 8/2009 | Jiang et al. | |
| 2011/0036772 A1 | 2/2011 | Banerjee | |
| 2015/0166343 A1 | 6/2015 | Berry et al. | |
| 2015/0166352 A1 | 6/2015 | Berry et al. | |

FOREIGN PATENT DOCUMENTS

| | | |
|---|---|---|
| CN | 102531105 A | 7/2012 |
| DE | 102014112108 B3 | 6/2015 |
| EP | 1318105 A1 | 6/2003 |
| EP | 2904892 A1 | 8/2015 |

OTHER PUBLICATIONS

Extended European Search Report, Application No. 16162274.1-1371, dated May 24, 2016, 7 pages.
Novelty Search, Patiq Oy, Report completed Oct. 12, 2015, 17 pages.
Office Action; EP Application No. 17162458.8; dated Dec. 6, 2017 (4 pages).

* cited by examiner

*Primary Examiner* — Stuart L Hendrickson
(74) *Attorney, Agent, or Firm* — Ziegler IP Law Group, LLC

(57) ABSTRACT

A method for removal and recovery of phosphorus includes a precipitation step for precipitating phosphorus from a liquid stream comprising at most 30 mg of phosphorus per liter and at most than 50 mg of suspended solids per liter, using a precipitation agent, to form a precipitate, to form a precipitate; a first separation step for separating the precipitate from the liquid stream; a dissolution step for dissolving the precipitate in phosphoric acid to obtain a first solution; and a second separation step for separating the phosphoric acid and the precipitation agent.

15 Claims, 2 Drawing Sheets

METHOD OF PHOSPHORUS REMOVAL AND RECOVERY

FIELD

The aspects of the disclosed embodiments relate to a method of phosphorus removal and recovery, especially from a wastewater.

BACKGROUND

Wastewater from various origins is treated in wastewater treatment plants, in order to remove residues harmful for humans, animals, receiving waterbody and the nature in general. Typically, organic residue, phosphorus and nitrogen is removed from the wastewater. The purified water is then either returned to waterbody (such as a river, a lake or a sea) or reused as such (in agriculture or industry or as a raw water for drinking water purification). Phosphorus is, among other nutrients, responsible for eutrophication of natural waters. On the another hand, phosphorus is an essential material for fertiliser production as well as other chemical industry purposes, while at the same time it is becoming increasingly difficult to extract from nature and the reserves dry up. One possible phosphorus circulation flows through wastewater treatment process which makes it an interesting raw material source for recovered phosphorus. Existing recovery technologies focus strongly on side streams of the actual wastewater treatment processes i.e. wastewater sludge treatment processes or even burned sludge ash. However, the amount of phosphorus in the side stream wastewaters is typically rather low, thus making its recovery less profitable due to the small product streams obtained. Furthermore, recovery of phosphorus from ashes leads to a rather low yield of phosphorus, when compared to the amount of phosphorus entering the process, and as heavy metals concentrate in the ashes, recycling of the ashes is rather challenging. Moreover, very few techniques take into account recycling of possible precipitation agents and the effect such recycling has on the economic aspects of the process.

Document EP 2904892 presents a method for extracting phosphorus and nitrogen from a sludge. The method is suitable for sludges containing high amounts of phosphorus and nitrogen and does not directly result in a water stream that could be disposed of in a river or a sea. Document DE 10 2014 112108 discloses a traditional method where the phosphorus is precipitated in the sludge, the sludge is treated and phosphorus is recovered from the sludge. Document U.S. Pat. No. 4,565,680 presents a method from recovering phosphorus and aluminium from spent acid from an aluminium process. The method does not require using a precipitating agent, as aluminium is present in the spent acid.

SUMMARY

The aspects of the disclosed embodiments provide a method for phosphorus removal and recovery from main wastewater process stream or equal liquid waste streams, such as from biologically treated wastewater as well as ensuring efficient removal of the phosphorus from these liquid streams. Additionally the recovery potential can be maximized due to main stream recovery position. The aspects of the disclosed embodiments further provide a phosphorus removal and recovery method that is more widely usable combined with several kind of wastewater treatment methods as well as also in mid-size and smaller wastewater treatment units than previously known methods, while at the same time being more cost-efficient and enabling main stream phosphate harvesting for centralized upgrading units, which has not been presented in previous methods. The aspects of the disclosed embodiments also provide a method and process where the agents and reagents used can be re-circulated into the process, which, to the best of the inventor's knowledge, was not possible at the time of making of this invention. A still further aspect of the disclosed embodiments provides a method and process that enable upgrading of recovered phosphorus in other industries, such as for use in fertilisers.

The aspects of the disclosed embodiments relate to a method for removal and recovery of phosphorus. Typically, the method comprises a) a precipitation step for precipitating phosphorus from a liquid stream comprising at most 30 mg of phosphorus per liter and at most than 50 mg of suspended solids per liter, using a precipitation agent, to form a precipitate, b) a first separation step for separating the precipitate from the liquid stream, c) a dissolution step for dissolving the precipitate in phosphoric acid to obtain a first solution, and d) a second separation step for separating the phosphoric acid and the precipitation agent.

DETAILED DESCRIPTION

Figure 1:
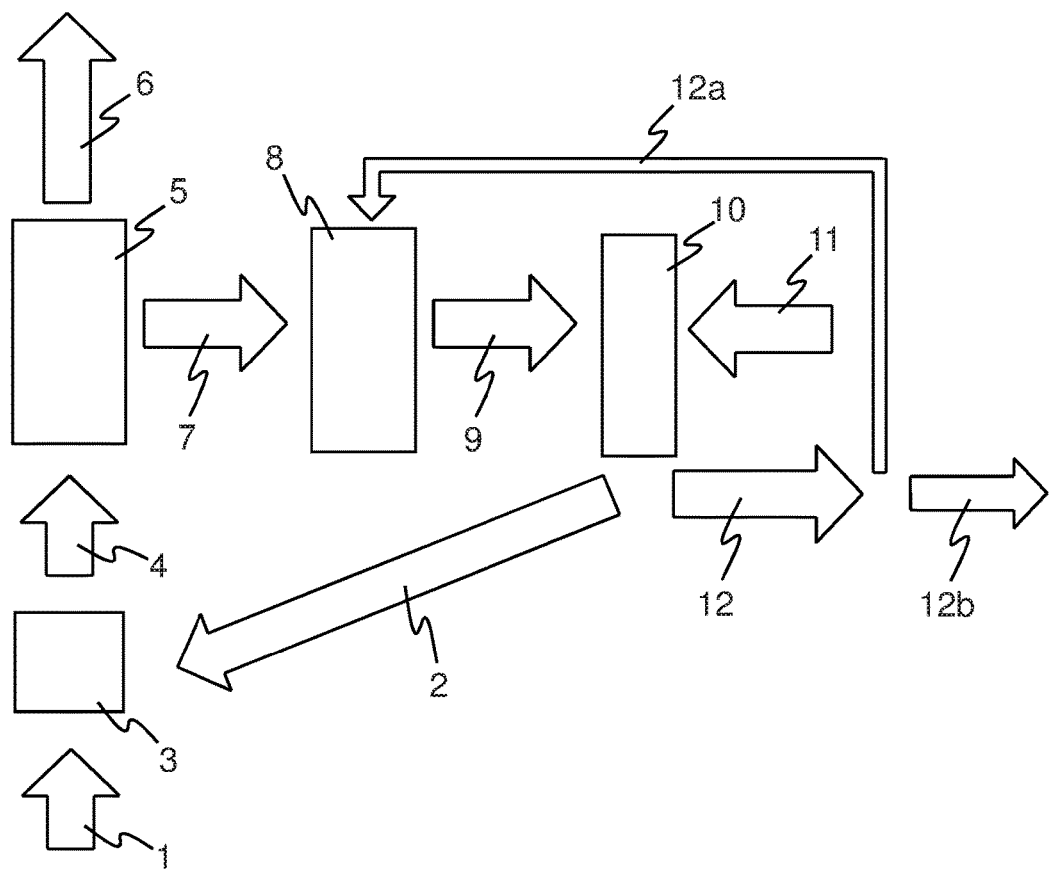
FIG. 1 schematically illustrates a process according to an embodiment.

The aspects of the disclosed embodiments relate to a method for removal and recovery of phosphorus. Typically, the method comprises a) a precipitation step for precipitating phosphorus from a liquid stream comprising at most 30 mg of phosphorus per liter and at most than 50 mg of suspended solids per liter, using a precipitation agent, to form a precipitate, b) a first separation step for separating the precipitate from the liquid stream, c) a dissolution step for dissolving the precipitate in phosphoric acid to obtain a first solution, and d) a second separation step for separating the phosphoric acid and the precipitation agent.

The method and process thus comprises a first step, carried on a liquid stream comprising phosphorus. The liquid stream may come from various sources, such as from wastewater treatment, mining processes or other industrial processes. The liquid stream is advantageously treated such that it does not contain any major amounts of organic compounds or solids. According to a preferred embodiment, the present method is carried out after conventional biological treatment of wastewater, where organic compounds and suspended solids removal is a minimum requirement. In the present method the phosphorous contained in the liquid stream is post-precipitated, using a precipitation agent. The present method is preferably carried out at the end of the conventional wastewater treatment process. This step already differentiates from currently commonly used methods of phosphorus removal in biological wastewater treatment, as the phosphorus is now removed only at the end of the biological treatment. This post-precipitation maximises the flow and mass of phosphorus precipitate, which makes future recovery process more economic than existing phosphorus recovery methods meant for smaller side flows. The precipitation step leads to a mixture comprising the precipitated phosphorus and the precipitation agent (which together form a precipitate) as well as the treated liquid stream.

The precipitation agent may be for example selected from a group consisting of aluminium sulphate $Al_2(SO_4)_3$, ferric sulphate $Fe_2(SO_4)_3$, and aluminium chloride $AlCl_3$. The precipitation agent is also selected in function with the nature of the liquid stream to be treated, i.e. its composition.

The liquid stream comprises at most 30 mg of phosphorus per liter and at most than 50 mg of suspended solids per liter. The amount of suspended solids is determined using the method described in (SFS-EN 872:2005. As according to the standard, the results may vary within a range of ±10%. According to an embodiment, the amount of phosphorus per liter of liquid is 1-30 mg/l, or preferably 1-10 mg/l. The amount can be for example from 1, 2, 3, 4, 5, 6, 7, 8, 9, 10, 12, 15, 18, 20, 22, 25 or 26 mg/l up to 2, 3, 4, 5, 6, 7, 8, 9, 10, 12, 15, 18, 20, 22, 25, 26 or 30 mg/l. The amount of suspended solids per liter of liquid can be for example 5-50 mg/l, preferably 5-20 mg/l. The amount can be for example from 5, 10, 15, 20, 25, 30, 35, 40 or 45 mg/l up to 10, 15, 20, 25, 30, 35, 40, 45 or 50 mg/l.

According to an embodiment, the precipitation step is carried out at a temperature of 5-45° C. The temperature in this step can be for example from 5, 10, 15, 20, 25, 30, 35 or 40° C. up to 10, 15, 20, 25, 30, 35, 40 or 45° C. In a typical process, the pH of the liquid stream does not need to be adjusted for this step, but the pH of the liquid stream can be maintained, for example the pH of the wastewater. Furthermore, it may be advantageous to first perform a rapid mixing when the precipitation agent is added to the liquid stream, followed by a slow mixing phase i.e. flocculation.

The mixture formed in the precipitation step is then subjected to a first separation step, in which the formed precipitate (comprising phosphorus and the precipitation agent) is separated from the liquid stream. The products of the first separation step are thus a treated liquid stream free from phosphorus, and the precipitated phosphorus (precipitate).

The first separation step can be carried out by any suitable process. Some examples are by filtration, flotation or sedimentation. For example conventional sedimentation process based on gravitation, disc filtration, sand filtration or flotation can be used. According to an embodiment, the first separation step is carried out at a temperature of 5-45° C. The temperature in this step can be for example from 5, 10, 15, 20, 25, 30, 35 or 40° C. up to 10, 15, 20, 25, 30, 35, 40 or 45° C. In a typical process, the pH of the precipitate does not need to be adjusted for this step, but the pH of the precipitate can be maintained.

In a preferred embodiment, the first separation step is followed by a concentration step in order to reduce the volume of the precipitate before the following steps. The concentration step thus lowers the amount of liquid in the precipitate. In case the liquid stream to be treated is wastewater (such as from biological wastewater treatment unit), the concentration step lowers the amount of liquid in the chemical sludge formed in the first separation step (i.e. the precipitate forms a chemical sludge in this case). This concentration step is however optional, and might not be necessary if a significant amount of liquid has been removed at an earlier stage. The concentration step may be carried out by sedimentation, centrifugation, filtering (for example with a vacuum or pressure filter), by thermal concentration or by combination of two or more of these processes. Typically, the dry matter content of the precipitate (such as the chemical sludge) after this concentration step is 10-90%.

The precipitate, optionally concentrated, is then subjected to a dissolution step for dissolving the precipitated phosphorus and precipitation agent in phosphoric acid to obtain a first solution. Use of phosphoric acid is essential in that it enables the formation of the valuable final product, phosphoric acid itself, instead of a product difficult to purify or use. The chemical sludge dissolves and forms dihydrogen phosphate and ions, the nature of the ions depending on the nature of the precipitation agent (for example aluminium or iron ions). According to an embodiment, the pH in the dissolution step is below 3. Preferably, the pH is as low as is economically feasible.

According to another embodiment, the dissolution step is carried out at a temperature of 10-80° C. The temperature can be for example from 10, 15, 20, 25, 30, 35, 40, 45, 50, 55, 60, 65 or 70° C. up to 20, 25, 30, 35, 40, 45, 50, 55, 60, 65, 70, 75 or 80° C. The temperature can also be higher, if the dissolution is carried out under increased pressure (i.e. at a pressure higher than the atmospheric pressure. Typically, the pressure would be maximum 5 bar and the temperature maximum 152° C.

The first solution is further subjected to a second separation step for separating the phosphoric acid solution and the precipitation agent ions. Various possibilities exist for the separation technique and process. Some suitable processes are processes based on ion exchange, for example those using an ion exchange resin or an ion exchange membrane. The ion exchange process is based on the exchange of the for example iron or aluminium ions to hydrogen ions (H+). The process typically needs an acid, such as sulphuric acid, as a source of hydrogen ions. In case the precipitation agent is aluminium sulphate or ferric sulphate, using sulphuric acid in the second separation step allows re-generation of the precipitation agent and hence it can be re-circulated into the process. This increases significantly the economic and environmental efficiency of the whole process, as no or very little additional precipitation agent is needed for the precipitation step, which is an exceptional improvement compared to existing technologies in wastewater industry and related recovery technologies However, also other processes can be used for the second separation step. When an ion exchange process is used, it may require adding a regeneration solution to the ion exchange apparatus.

According to an embodiment, the second separation step is carried out at a temperature of 10-60° C. The temperature can thus be for example from 10, 15, 20, 25, 30, 35, 40, 45, 50 or 55° C. up to 15, 20, 25, 30, 35, 40, 45, 50, 55 or 60° C. In one preferred embodiment, the temperature is 40-50° C. The pH in the second separation step can be 3 or less. Typically, the pH is the same as in the preceding step.

The second separation step also yields phosphoric acid that can be for example re-circulated into the dissolution step. The process typically results in the formation of more phosphoric acid than what is required in the dissolution step, and this excess or surplus phosphoric acid can be used either directly in other industries such as in fertiliser production, food industry or forest industry. Additionally it can be used in an additional step of the process, namely the removal and recovery of nitrogen. Upgrading potential and market value of the phosphoric acid is much higher compared to end products of other technologies like struvite.

As mentioned above, when an ion exchange process is used as the second separation step, it may require adding a regeneration solution (comprising an acid) to the ion exchange apparatus. The precipitation agent recovered from this second separation step thus typically comprises a certain amount of the acid used for the regeneration. The amount of acid depends on the process used and its removal from the recovered precipitation agent thus also depends on the process used. In some cases, it may be advantageous to recover also this acid (typically un-reacted). The recovery may be carried out for example by nanofiltration or by an ion exchange process. The recovered acid can be re-circulated into the regeneration solution.

According to an embodiment, the method can further comprise a combined method for nitrogen removal and recovery of nitrogen rich water in a stripper with a base at a pH of 9 or more. Indeed, the sludge that is formed as a side product during biological wastewater treatment process comprises nitrogen. If anaerobic digestion is used for sludge stabilisation and biogas production, the nitrogen from the sludge cells is released to the sludge liquor (reject water), as a form of ammonium $NH_4$. To improve nitrogen removal process in the main stream of the wastewater treatment process, this side stream nitrogen however is profitable to be removed from the reject water.

For example, this added step is used for digested sludge liquor (reject water) ammonium $NH_4$, when the above process for removal and recovery of phosphorus is used for the liquid stream from a biological wastewater treatment. Treating the reject water from digested sludge treatment process in a stripper with a base at a pH of more than 9, and washing the obtained ammonia with phosphoric acid to obtain ammonium phosphate allows an effective removal and recovery of nitrogen. This is known as a chemical stripping process, and it is typically done by adding a base to the reject water, for example sodium hydroxide or calcium hydroxide. The basic conditions then cause transformation of the ammonium into ammonia $NH_3$. The ammonia contained in the reject water is then preferably treated by stripping, i.e. by feeding the sludge water and air into a stripper, whereby the ammonia transfers from the water phase into the air phase.

In a further step, the air-ammonia mixture is washed with an acid. According to a preferred embodiment, this washing is carried out using the phosphoric acid obtained in the phosphorus recovery as explained above. The end result of this nitrogen removal and recovery process is monoammonium dihydrogen phosphate (MAP) and diammonium hydrogen phosphate (DAP). Both MAP and DAP can be used directly as fertilisers or they can be used for manufacturing a further fertiliser.

The present method thus provides a possibility to remove phosphorus from liquid streams and to use it in different processes. The phosphorus can be used for example in other industries. When the present method is part of biological wastewater treatment, part or all of the recovered phosphorus (as phosphoric acid) can be used in treating the digested sludge liquor, thus enabling also potentially profitable way of nitrogen removal and recovery from the sludge liquid.

Experimental Part

Generalized Method to Form a Precipitate in Biologically Treated Wastewater

The experiments were performed either in laboratory, thus using a simulated wastewater or a biologically treated wastewater which phosphorus content was increased, or using a chemical sludge produced at a pilot plant (first separation step) connected to a water treatment unit. Indeed, in the current wastewater treatment process to which the inventors had access, phosphorus was removed in a different manner and hence the phosphorus concentration of biologically treated wastewater needed to be increased, in order to simulate the raw material (wastewater) of the present process. When the pilot plant was used, the phosphorus concentration was also increased for the incoming liquid stream to better correspond to a situation where phosphorus is not removed in earlier steps of the wastewater treatment.

Simulated wastewater was tap water into which an aqueous solution of potassium dihydrogen phosphate ($KH_2PO_4$) having a phosphorus content of 100 mg/l was added, in an amount to result in a phosphorus content of 5 mg/l of the simulated wastewater The increase in phosphorus content of the biologically treated wastewater was carried out by adding, to 0.5 l of a biologically treated wastewater, an aqueous solution of potassium dihydrogen phosphate ($KH_2PO_4$) having a phosphorus content of 200 mg/l, in an amount to result in a phosphorus content of 5 mg/l of the biologically treated wastewater. Another option would be to use a solution having a phosphorus content of 100 mg/l.

The pH of the solution was measured using a Metrohm 827 pH-measurement device, and alkalinity of the samples was determined according to SFS-EN ISO 9963-1/1996.

The next step was addition of aluminium or iron to the wastewater, in order to precipitate the phosphorus. The precipitate from a single 0.5 l sample was treated as one sample in the further steps. Table 1 discloses the amounts (in mg) of phosphorus and aluminium or iron used.

TABLE 1

|  | Al (mg) | P (mg) | Fe (mg) |
| --- | --- | --- | --- |
| Aluminium precipitate | 4.7 | 2.5 |  |
| Iron precipitate |  | 2.5 | 14.1 |

A biologically and chemically treated wastewater was fed into the pilot plant of the first separation step. The content of phosphorus of the feed was increased by adding monopotassium phosphate ($KH_2PO_4$) in an amount sufficient to obtain the desired total potassium content (total P in). Table 2 illustrates the phosphorus content of the wastewater being fed into the first separation step for two trials as well as the phosphorus content of the wastewater after the first separation step (total P out) for two liquid streams from chemical treatment. The measurement method was according to SFS 3026 mod. DA.

TABLE 2

| Trial | total P in (mg/l) | total P out (mg/l) |
| --- | --- | --- |
| 1 | 3.7 | 0.29 |
| 2 | 5.05 | 0.215 |

Precipitation Agent Comparison

Simulated Wastewater

The simulated wastewater was manufactured as explained above, using a solution of potassium dihydrogen phosphate ($KH_2PO_4$) having a phosphorus content of 200 mg/l. Aluminium sulphate $Al_2(SO_4)_3 \cdot 14H_2O$ and iron sulphate $Fe_2(SO_4)_3$ were tested as precipitation agents. Both were made into concentrated aqueous solutions, having a concentration of 10 000 mg/l.

The precipitation step was carried out by a Flocculator 2000 flocculation device from Kemira Oy. The amount of precipitation agent as a concentration agent added to each sample is given in Table 3. If needed, the pH of the sample was adjusted using hydrogen chloride or sodium hydroxide, as the target pH was 5-6.5 (pH modification was needed for the simulated wastewater when using large amounts of precipitation agent).

TABLE 3

| | $Me^{3+}$ (mg/l) | $Me^{3+}$ (mmol) | Al:P (mol:mol) | Dosage (ml) |
|---|---|---|---|---|
| $Al_2(SO_4)_3 \cdot 14\ H_2O$ (mg/l) | | | | |
| 50 | 4.5 | 0.168 | 1:1 | 5 |
| 75 | 6.8 | 0.252 | 1.5:1 | 7.5 |
| 100 | 9.0 | 0.336 | 2:1 | 10 |
| 150 | 13.6 | 0.505 | 3:1 | 15 |
| 200 | 18.0 | 0.673 | 4:1 | 20 |
| $Fe_2(SO_4)_3$ (mg/l) | | | | |
| 35 | 10 | 0.175 | 1:1 | 3.5 |
| 50 | 14 | 0.25 | 1.5:1 | 5 |
| 65 | 18.2 | 0.325 | 2:1 | 6.5 |
| 95 | 26.5 | 0.475 | 3:1 | 9.5 |
| 125 | 34.9 | 0.625 | 4:1 | 12.5 |

The precipitation step comprised mixing the sample, using first a mixing speed of 400 rpm for 10 seconds, followed by a mixing speed of 50 rpm for 4 minutes. Thereafter, the samples were allowed to settle for 30 minutes, followed by a measure of pH.

After precipitation, a sub-sample was taken from each sample's precipitation solution by filtering 100 ml of the supernatant liquid, using a Whatman membrane filter (0.45 μm). The total amount of phosphorus and metal (Al or Fe) was determined from the sub-sample, as explained in the following paragraph.

A part of the precipitate (about 2-3 ml) was centrifuged using a Hettlich RAPINA 380 centrifuge (program 3500 rpm) for 30 minutes. The centrifuged precipitate was weighted and transferred to a wet combustion tube, into which 6 ml of concentrated nitric acid ($HNO_3$, 65%) and 2 ml of hydrogen peroxide ($H_2O_2$, 30%) was added. Thereafter, wet combustion was carried out and the samples were diluted to a volume of 50 ml with water. The total amount of phosphorus and the total amount of metal (Al or Fe) in the precipitate was determined from this solution, using the methods according to standards SFS-EN ISO 11885:2009 (phosphorus), SFS-EN ISO 17294-2:2005 (Al) and SFS-EN ISO 11885:2009 (Fe).

Biologically Treated Wastewater

The same precipitation agents were used as above, with the exception that the concentration of their solutions was 100 000 mg/l. The higher concentration allowed to lower the volume needed for the precipitation step.

The increase in phosphorus content of the biologically treated wastewater from the wastewater treatment plant Viikinmaki was carried out by as explained above, using a solution of potassium dihydrogen phosphate ($KH_2PO_4$) having a phosphorus content of 100 mg/l. Thereafter, the precipitation step was carried out, as explained above, using the amounts as disclosed in Table 4, and a total volume of 1 l for each sample.

TABLE 5

| | $Me^{3+}$ (mg/l) | $Me^{3+}$ (mmol) | Me:P (mol:mol) | Dosage (ml) |
|---|---|---|---|---|
| $Al_2(SO_4)_3$ 14 $H_2O$ (mg/l) | | | | |
| 50 | 4.5 | 0.168 | 1:1 | 0.5 |
| 75 | 6.8 | 0.252 | 1.5:1 | 0.75 |
| 100 | 9.0 | 0.336 | 2:1 | 1 |
| 150 | 13.6 | 0.505 | 3:1 | 1.5 |
| 200 | 18.0 | 0.673 | 4:1 | 2 |
| $Fe_2(SO_4)_3$ (mg/l) | | | | |
| 35 | 10 | 0.175 | 1:1 | 0.35 |
| 50 | 14 | 0.25 | 1.5:1 | 0.5 |
| 65 | 18.2 | 0.325 | 2:1 | 0.65 |
| 95 | 26.5 | 0.475 | 3:1 | 0.95 |
| 125 | 34.9 | 0.625 | 4:1 | 1.25 |

Tables 5 and 6 illustrate the concentrations in phosphorus and metals after the membrane filtration that was carried out as explained above. In Table 5, (k*) means that pH has been adjusted by adding NaOH.

As can be seen, when $Al_2(SO_4)_3.14H_2O$ was used as a precipitation agent, amounts at and above 100 mg/l allow the reduction of the amount of phosphorus to below 0.5 mg/l. Similarly, when $Fe_2(SO_4)_3$ was used, amounts close to 65 mg/l and certainly amounts at and above 95 mg/l allow the reduction of the amount of phosphorus to below 0.5 mg/l.

TABLE 5

| $Al_2(SO_4)_3$ 14 $H_2O$ (mg/l) | n(Al) (mmol) | Al:P (mol:mol) | pH after precipitation | Total amount of filtered P (mg/l) | Filtered Al (mg/l) |
|---|---|---|---|---|---|
| 50 | 0.168 | 1 | 6.0 | 2 | 0.022 |
| 75 | 0.252 | 1.5 | 5.7 | 0.59 | 0.053 |
| 100 | 0.336 | 2 | 4.3 | 0.4 | 2.3 |
| 150 | 0.505 | 3 | 5.8 (k)* | 0.021 | 0.067 |
| 200 | 0.673 | 4 | 6.0 (k)* | 0.015 | 0.035 |

TABLE 6

| $Fe_2(SO_4)_3$ (mg/l) | n(Fe) (mmol) | Fe:P (mol:mol) | pH after filtering | Total amount of filtered P (mg/l) | Filtered Fe (mg/l) |
|---|---|---|---|---|---|
| 35 | 0.175 | 1 | 6.6 | 1.8 | 0.098 |
| 50 | 0.25 | 1.5 | 6.5 | 1.1 | 0.11 |
| 65 | 0.325 | 2 | 6.3 | 0.51 | 0.11 |
| 95 | 0.475 | 3 | 6.1 | 0.058 | 0.13 |
| 125 | 0.625 | 4 | 5.9 | 0.019 | 0.13 |

As can be seen from the results above, determination of the amount of phosphorus in the supernatant liquid allows to determine the amount of precipitation agent that will lead to an amount of phosphorus below 0.5 mg/l in the filtered supernatant.

As is explained above, the amount of phosphorus and metal was determined in the precipitate, and results are given in Table 7. The sample processing was carried out with wet combustion method as explained above.

TABLE 7

| Precipitation agent | Amount of precipitation agent (mg/l) | Al (mg/kg) | P (mg/kg) | Fe (mg/kg) |
|---|---|---|---|---|
| $Al_2(SO_4)_3 \cdot 14\ H_2O$ | 100 | 4400 | 2600 | |
| $Fe_2(SO_4)_3$ | 95 | | 2600 | 8900 |

Dissolution Tests with Biologically Treated Wastewater

All dissolution tests except for one were carried out using a standard volume, meaning that the amount of added acid was 5 ml for each precipitate sample. The amount of each precipitate sample was also kept constant (1 ml). A batch of acid was added to each precipitate sample, using a predetermined concentration of the acid. Dissolution was allowed to take place during 30 minutes using a magnetic stirrer (100 rpm). Thereafter, the solution was centrifuged for 30 min (3500 rcf). The total dissolution time was thus 60 min. A sub-sample was again taken from each centrifuged sample, for the determination of phosphorus and aluminium or iron with inductively coupled plasma optical emission spectroscopy (ICP-OES) analysis.

Based on the preliminary results above, more detailed studies were carried out. For this, three parallel samples were prepared for the most promising concentrations of acid. The amount of chemical elements was determined with inductively coupled plasma optical emission spectroscopy (ICP-OES) analysis was used, using the measuring parameters and calibration areas as presented in Table 8. The apparatus used was PerkinElmer ICP-OES Optima 8300.

TABLE 8

| | Fe | Al | P |
|---|---|---|---|
| Flow of plasma gas (Ar l/min) | 8 | 8 | 8 |
| Flow of auxiliary gas (l/min) | 0.2 | 0.2 | 0.2 |
| Flow of nebulizer gas (Ar l/min) | 0.6 | 0.6 | 0.6 |
| Power of plasma (W) | 1500 | 1500 | 1500 |
| Direction of measurement | Radial | Radial | Axial |
| Wavelengths (nm) | 238.204 | 396.153 | 213.617 |
| | 239.204 | 308.215 | 214.914 |
| | 259.939 | 394.401 | |
| Calibration area (mg/l) | 2.5-250 | 1-100 | 1-100 |

An average was calculated from the parallel samples, as well as standard deviation, for each measurement wavelength. The molar ratios of the acids used in the dissolution tests per one mole of phosphorus are given in Table 9 (precipitation agent $Fe_2(SO_4)_3$), for a volume of 5 ml of the acid. The average pH, as measured with a pH-meter, for each acid before and after dissolution of the precipitates are given in Table 10, using as precipitation agent $Fe_2(SO_4)_3$.

TABLE 9

| Acid | Concentration (mol/l) | Amount (mol) Acid | Amount (mol) P | Molar ratio (mol/mol) Acid/P |
|---|---|---|---|---|
| $H_3PO_4$ | 7 | $3.5\ 10^{-2}$ | $8.07\ 10^{-5}$ | 434 |
| $H_3PO_4$ | 2.3 | $1.15\ 10^{-2}$ | $8.07\ 10^{-5}$ | 143 |
| HCl | 1 | $5.0\ 10^{-3}$ | $8.07\ 10^{-5}$ | 62 |
| HCl | 0.32 | $1.6\ 10^{-3}$ | $8.07\ 10^{-5}$ | 20 |

TABLE 10

| Acid | Concentration (mol/l) | pH before | pH after |
|---|---|---|---|
| $H_3PO_4$ | 7 | <0 | 0.6 |
| $H_3PO_4$ | 2.3 | 0.5 | 0.9 |
| HCl | 1 | 0 | 0.4 |
| HCl | 0.32 | 0.5 | 0.9 |

Some samples that were dissolved with phosphoric acid at different concentrations were also measured in a semi-quantitative way, using Perkin Elmer Optima 8300 device. Wet precipitates were dissolved into phosphoric acid having two different concentrations, namely 2.3 molar and 7 molar and the average (as well as standard deviation for three parallel samples) of the dissolved mass of the wet precipitate obtained using $Fe_2(SO_4)_3$ as precipitation agent. The results are shown in Table 11 (for 2.3 molar phosphoric acid) and Table 12 (for 7 molar phosphoric acid).

TABLE 11

| Wavelength (nm) | 238.204 | 239.204 | 259.939 |
|---|---|---|---|
| Fe (%) | 67 ± 4 | 67 ± 4 | 67 ± 4 |

TABLE 12

| Wavelength (nm) | 238.204 | 239.204 | 259.939 |
|---|---|---|---|
| Fe (%) | 88 ± 11 | 88 ± 11 | 88 ± 11 |

TABLE 13

| Wavelength (nm) | 238.204 | 239.204 | 259.939 |
|---|---|---|---|
| Fe (%) | 31 ± 9 | 31 ± 9 | 31 ± 9 |

Furthermore, dissolution of dried precipitate obtained using $Fe_2(SO_4)_3$ as precipitation agent was tested in 7 molar phosphoric acid, the results being listed in Table 13.

Tables 11-13 indicate only the mass of the dissolved iron, as the amount of phosphorus comprised in the precipitate was too small compared to the amount of phosphorous in the phosphoric acid, that it could not be detected.

Dissolution Test with Response Surface Methodology

The sludge from the pilot plant connected to the chemical wastewater treatment unit was also tested with RSM (response surface methodology), wherein a wet sludge was placed in water bath using different temperatures (20-60° C.), different concentrations of phosphoric acid (0.5-2 M) and different dissolution times (2-6 h). The test conditions for each test (in total 30 tests) are given in Table 14. The amount of sample to be dissolved was 2 g in each test and the samples were mixed during the dissolution using a magnetic stirrer (250 rpm). Once the dissolution was over, the samples were placed in a centrifuge for 10 minutes at 3500 rcf (relative centrifugal force) and the solution of phosphoric acid was filtered using Whatman filter paper Grade No. 41.

Test samples for measuring concentration of aluminium using an ICP-OES spectrometer were prepared from the filtered solution of phosphoric acid and the amounts of aluminium are given also in Table 14, both as mass and content for each test. The dissolution results were analysed using the program Minitab 17.

The amount of dissolved aluminium was selected as response, as the aim was to obtain a solution comprising as much as possible of aluminium. Based on the selected model, the volume of acid, the time of dissolution and the temperature do have a statistically significant effect. The model was used to draw response surface-plots, in which the third variable is kept constant. The "Response optimisation" of Minitab calculates, based on the model, variable values that give the highest possible response. The results show that the highest content of aluminium is obtained using a volume of 5 ml for the acid, a time of dissolution of 6 hours and a temperature of 60° C. The expected content of aluminium is then 2.4 g/l.

The residual plots of the model confirm that the assumptions of the model have been realised. The normal probability plot shows that the residuals follow a normal distribution. The histogram confirms that the residuals have not been distorted in either way. The plot of residuals vs. fits illustrates that the residuals are randomly distributed and no pattern is visible. The plot of residuals vs. order shows that the residuals do not correlate with each other.

Based on the model formed using the response surface-method, a wet sludge (2 g) was diluted in 5 ml of phosphoric acid in a water bath at 60° C. for six hours. The concentration of the acid varied from between 0.5, 0.7 and 2 mol/l and three parallel tests were carried out for each concentration. After dissolution, the samples were centrifuged for 10 minutes at 3500 rcf and the acid solution was filtered out from the residual precipitates. The aluminium content of samples prepared from the solution of phosphoric acid was measured.

The residual precipitates were washed with ultra-purified water (5 ml), weighted and dissolved in aqua regia in an ultrasonic bath (4×3 min, power 100%, frequency 37 kHz and temperature 60° C. After dissolution, the samples were again filtered into 50 ml volumetric flasks and filled up. Aluminium and phosphorus contents of the samples were measured.

TABLE 14

| Sample | Concentration of acid | Volume of acid (ml) | Temperature (° C.) | Time (h) | Al (mg/l) | Al (mg) |
|---|---|---|---|---|---|---|
| 1 | 2 | 5 | 20 | 2 | 2372.2 | 11.9 |
| 2 | 0.5 | 15 | 20 | 2 | 1038.7 | 15.6 |
| 3 | 0.5 | 5 | 60 | 2 | 2105.8 | 10.5 |
| 4 | 2 | 15 | 60 | 2 | 864.0 | 13.0 |
| 5 | 0.5 | 5 | 20 | 6 | 2231.5 | 11.2 |
| 6 | 2 | 15 | 20 | 6 | 885.0 | 13.3 |
| 7 | 2 | 5 | 60 | 6 | 2461.3 | 12.3 |
| 8 | 0.5 | 15 | 60 | 6 | 848.0 | 12.7 |
| 9 | 1.25 | 10 | 40 | 4 | 1219.8 | 12.2 |
| 10 | 1.25 | 10 | 40 | 4 | 1498.3 | 15.0 |
| 11 | 0.5 | 5 | 20 | 2 | 2183.3 | 10.9 |
| 12 | 2 | 15 | 20 | 2 | 962.3 | 14.4 |
| 13 | 2 | 5 | 60 | 2 | 1993.7 | 10.0 |
| 14 | 0.5 | 15 | 60 | 2 | 983.1 | 14.7 |
| 15 | 2 | 5 | 20 | 6 | 2152.9 | 10.8 |
| 16 | 0.5 | 15 | 20 | 6 | 901.5 | 13.5 |
| 17 | 0.5 | 5 | 60 | 6 | 2491.8 | 12.5 |
| 18 | 2 | 15 | 60 | 6 | 882.4 | 13.2 |
| 19 | 1.25 | 10 | 40 | 4 | 1188.7 | 11.9 |
| 20 | 1.25 | 10 | 40 | 4 | 1163.7 | 11.6 |
| 21 | 0.5 | 10 | 40 | 4 | 1296.3 | 13.0 |
| 22 | 2 | 10 | 40 | 4 | 1228.2 | 12.3 |
| 23 | 1.25 | 5 | 40 | 4 | 2215.6 | 11.1 |
| 24 | 1.25 | 15 | 40 | 4 | 896.3 | 13.4 |
| 25 | 1.25 | 10 | 20 | 4 | 1244.5 | 12.4 |
| 26 | 1.25 | 10 | 60 | 4 | 1286.2 | 12.9 |
| 27 | 1.25 | 10 | 40 | 2 | 1408.8 | 14.1 |
| 28 | 1.25 | 10 | 40 | 6 | 1286.2 | 12.9 |
| 29 | 1.25 | 10 | 40 | 4 | 1221.2 | 12.2 |
| 30 | 1.25 | 10 | 40 | 4 | 1279.6 | 12.8 |

Table 15 illustrates the amount of dissolved aluminium both as mass and concentration, for each acid concentration as an average of three parallel measurements. Table 16 illustrates the pH of the solution of phosphoric acid before and after dissolution.

Table 17 shows the amount of aluminium and its percentage in the residual sludge as an average from three parallel tests. The Table also gives the percentage of aluminium remaining in the residual sludge, from the total amount of aluminium contained in the sludge. The percentage is very small in both cases, illustrating that almost all aluminium from the sludge is dissolved in the phosphoric acid. The variations between different concentrations of acid are due to the heterogeneity of the samples with respect to aluminium.

TABLE 15

| 0.5M (n = 3) | | 0.7M (n = 3) | | 2M (n = 3) | |
|---|---|---|---|---|---|
| mg/l | mg | mg/l | mg | mg/l | mg |
| 2200 ± 80 | 11 ± 0.4 | 1700 ± 60 | 8.5 ± 0.3 | 1890 ± 50 | 9.5 ± 0.3 |

TABLE 16

| $c(H_3PO_4)$ | 0.5M | 0.7M | 2M |
|---|---|---|---|
| pH before dissolution | 1.06 | 0.93 | 0.45 |
| pH after dissolution | 1.67 | 1.33 | 0.73 |

TABLE 17

| | 0.5M (n = 3) | 0.7M (n = 3) | 2M (n = 2) |
|---|---|---|---|
| $m(Al)_{residual}$ (mg) | 0.016 ± 0.008 | 0.025 ± 0.003 | 0.006 ±0.002 |
| m(residual sludge) (mg) | 51 ± 15 | 24 ± 5 | 26 ± 3 |
| Percentage of residual sludge (%) | 0.027 ± 0.012 | 0.078 ± 0.008 | 0.014 ±0.011 |
| $m(Al)_{total}$ (mg) | 11 ± 0.4 | 8.5 ± 0.3 | 9.6 ± 0.3 |
| Percentage $m(Al_{total})$ (%) | 0.15 | 0.3 | 0.06 |

The amount of dissolved phosphorus cannot be directly measured from the solution of phosphoric acid, but the masses of sludge samples can be compared to the phosphorus content (1580 mg/kg) obtained in the total decomposition, and thus estimate the amount of dissolved phosphorus. Table 18 lists the amount and relative amount (in percentage) of phosphorus in the residual sludges as an average from three parallel samples. Furthermore, the Table shows the percentage of phosphorus remaining in the residual sludge from the estimated total amount of phosphorus of the sludge. As can be seen, a maximum of 5% of phosphorus does not dissolve and thus it can be concluded that it is possible to efficiently dissolve phosphorus together with aluminium into phosphoric acid, with the present method.

TABLE 18

|  | 0.5M (n = 3) | 0.7M (n = 3) | 2M (n = 2) |
|---|---|---|---|
| $m(P)_{residual}$ (mg) | 0.05 ± 0.03 | 0.16 ± 0.02 | 0.11 ± 0.03 |
| m(residual sludge) (mg) | 51 ± 15 | 24 ± 5 | 26 ± 3 |
| Percentage of residual sludge (%) | 0.1 | 0.7 | 0.4 |
| $m(P)_{total}$ (mg) | 3.187 ± 0.013 | 3.176 ± 0.006 | 3.18 ± 0.03 |
| Percentage $m(P_{total})$ (%) | 1.7 ± 0.9 | 5 ± 0.6 | 4 ± 1 |

Ion Exchange Process with Biologically Treated Wastewater and Cation Exchange Resin A cationic ion exchange resin Lewatit Monoplus SP 112 from KL-Lämpö Oy was used in all the test for the second separation step that was thus carried out as an ion exchange process. This resin is highly acid and macroporous, comprising a polymeric back bone of styrene divinyl benzene and as a functional group sulphonic acid.

The samples for this part of the test were prepared as explained above, using 5 l of biologically treated wastewater with added solution of $KH_2PO_4$ having a phosphorus content of 200 mg/l to obtain a phosphorus content of 5 mg/l. The precipitation agent was either $Fe_2(SO_4)_3$ or $Al_2(SO_4)_3 \cdot 14H_2O$. The phosphorus was filtered and weighted and dissolved in a sufficient amount of 0.7 molar hydrogen chloride. It was noticed that a highly concentrated hydrogen chloride (i.e. higher than 0.7 molar) prohibited the ion exchange.

The precipitate dissolved in the hydrochloric acid (the flow liquid) was passed through the chromatographic column packed with ion exchange resin with a flow speed of 0.1 BV/min (BV stands for bed volume of the resin). The flow liquid was sampled in samples of 10 ml, diluted to a volume of 100 ml with water and the amount of phosphorus and aluminium or iron were determined as explained above (using the methods according to standards SFS-EN ISO 11885:2009 (phosphorus), SFS-EN ISO 17294-2:2005 (Al) and SFS-EN ISO 11885:2009 (Fe)). After passage of the sample, the resin was eluted for 1 BV with an ion exchanged water, in order to completely remove the flow liquid from the resin. After the flow liquid was removed, the resin was regenerated and at the same time metal was removed from the resin with hydrogen chloride (10 m/v-%) solution as elution liquid.

Table 19 gives the amounts of iron precipitate in the flow liquid and the elution liquid at the ion exchange process, as well as the amounts of iron and phosphorus in these liquids. In the Table, *) stands for an eluted solution having a volume of 25 ml, including water.

TABLE 19

|  | c(Fe) (mg/l) | c(P) (mg/l) | V (l) | m(Fe) (mg) | m(P) (mg) |
|---|---|---|---|---|---|
| Flow liquid before ion exchange | 2720 | 544 | 0.025 | 68 | 14 |
| Flow liquid after ion exchange | 7 | 230 | 0.02 | 0.14 | 5 |
| Elution liquid (10 w/v- % HCl) | 1500 | 120 | 0.03* | 45 | 4 |

Table 20 gives the same results as Table 19, but for samples precipitated with or $Al_2(SO_4)_3 \cdot 14H_2O$. In Table 20, *) means that the volume of both the flow liquid and the elution liquid was 25 ml, including water. †) means that the resin was flushed with 5 BV of water before starting the elution

TABLE 20

|  | c(Al) (mg/l) | c(P) (mg/l) | V (l) | m(Al) (mg) | m(P) (mg) |
|---|---|---|---|---|---|
| Flow liquid before ion exchange | 1200 | 610 | 0.025 | 30 | 15 |
| Flow liquid after ion exchange | 4 | 390 | 0.03* | 0.1 | 12 |
| Elution liquid (10 w/v- % HCl) | 430 | 5 | 0.03* | 13 | 0.15† |

Solvent Extraction Process with Cationic Exchange Liquid

The test was started by preparing a solution of 250 mg/l aluminium in ultrapurified water using aluminium dihydrogen phosphate $Al(H_2PO_4)_3$. The concentration of aluminium was selected to be 250 mg/l, as the pH of the resulting solution was then 2.5, and there was no need to adjust the pH. Three solutions of different concentrations of bis(2-ethylhexyl)phosphoric acid (D2EHPA) were prepared as organic phase by diluting the amount of D2EHPA with kerosene into an amount of 0.93, 1.86 and 3.1 v/v-%. These amounts correspond to molar ratios D2EHPA/Al of 3, 6 and 10, when the concentration of aluminium in the solution is 250 mg/l.

Three parallel extractions were carried out for each D2EHPA-solution, in which the volume of the water phase (Al-solution) was 10 ml and the volume of the organic phase was 10 ml (ratio A/O was 1:1). The extractions were carried out in 50 ml separating funnels by hand shaking them for 5 minutes, whereafter the phases were allowed to separate and were recovered. Samples were prepared from the water phase and their content in aluminium and phosphorus were determined using an ICP-OES spectrometer.

Table 21 illustrates, in percentage, the amount of aluminium transferred in the liquid-liquid extraction, when the pH of the water phase was 2.5 and the molar ratio D2EHPA/Al varied between 3 and 10. The Table also contains pH of the water phase after extraction. With the highest molar ratio, approximately 90% (225 mg/l) of the aluminium is extracted into the organic phase. Previous results have shown that by using a molar ratio of 32, an almost complete (97%) transfer of aluminium into the organic phase is obtained. Therefore, using a molar ratio of 10-32 will lead to a sufficient transfer of the aluminium into the organic phase.

TABLE 21

| D2EHPA (mol/l) | 0.03 | 0.06 | 0.092 |
|---|---|---|---|
| D2EHPA/Al (mol/mol) | 3 | 6 | 10 |
| $Al_{transferred}$ (%) | 40.6 ± 0.3 | 72.45 ± 0.07 | 89.09 ± 0.05 |
| pH after extraction | 2.22 | 2.04 | 1.96 |

Aluminium (250 mg/l) was extracted into a solution of 3.1 v/v-% D2EHPA, resulting in an aluminium content of 225 mg/l in the organic phase. The organic phase was used in the stripping tests of Table 22, in which heat and a longer extraction time were used in order to improve transfer of aluminium into the water phase (a solution of sulphuric acid in this experiment). Three parallel extractions were carried out for each test. The extractions were carried out in water bath using a magnetic stirrer. After extraction, the phases were separated in a separating funnel and samples were prepared from the water phase. Aluminium content of the sample was determined.

TABLE 22

| Test | Parallel extrations (number) | c(sulphuric acid) (mol/l) | Heating (° C.) | Extraction time (min) | A/O | Acid/Al mol/mol | Acid/D2EHPA mol/mol |
|---|---|---|---|---|---|---|---|
| 1 | 3 | 0.01 | 30 | 30 | 1:1 | 1.2 | 0.11 |
| 2 | 3 | 0.01 | 50 | 30 | 1:1 | 1.2 | 0.11 |
| 3 | 3 | 0.09 | 30 | 30 | 1:1 | 11 | 0.98 |
| 4 | 3 | 0.09 | 50 | 30 | 1:1 | 11 | 0.98 |
| 5 | 3 | 0.9 | 30 | 30 | 1:1 | 110 | 10 |
| 6 | 3 | 0.9 | 50 | 30 | 1:1 | 110 | 10 |
| 7 | 3 | 1.65 | 30 | 30 | 1:1 | 200 | 18 |
| 8 | 3 | 1.65 | 50 | 30 | 1:1 | 200 | 18 |

Table 23 shows the percentage of aluminium transferred from the organic phase. When a solution of sulphuric acid having a concentration of 0.9 M or higher was used as strip liquor, at least 90% of the aluminium of the organic phase transferred to the solution of sulphuric acid. Table 24 shows the results of Student t-test, which was used to test the effect of temperature when the concentration of the sulphuric acid was kept at 0.9 M. The same test was carried out using a concentration of 1.65 M, the results are given in Table 25. This Table shows that there is no statistical difference in the results with different temperatures when the concentration is 0.9 M, while there is a statistical difference when a concentration of 1.65 M is used. Indeed, raising the temperature increases the efficiency of the extraction.

TABLE 23

| c($H_2SO_4$) | 0.01M | | 0.09M | | 0.9M | | 1.65M | |
|---|---|---|---|---|---|---|---|---|
| pH before extraction | 1.81 | | 0.99 | | 0.1 | | <0 | |
| T/° C. | 30 | 50 | 30 | 50 | 30 | 50 | 30 | 50 |
| Al (%) | <1.1 | 1.9 ± 0.2 | 4.5 ± 0.5 | 24 ± 3 | 90 ± 6 | 96.8 ± 0.5 | 97 ± 1 | 100 ± 0.3 |
| pH after extraction | 1.86 | 1.85 | 1.02 | 1.02 | 0.11 | 0.11 | <0 | <0 |

TABLE 24

| | 0.9M/30° C. | 0.9M/50° C. |
|---|---|---|
| Average | 89.85967937 | 96.76902 |
| Variance | 80.78781878 | 0.49388 |
| Observations | 3 | 3 |
| Pooled variance | 40.64084924 | |
| Estimated difference of averages | 0 | |
| va | 4 | |
| t statistics | −1.327396751 | |
| P(T <= t) one way | 0.127534946 | |
| t-critical one way | 2.131846786 | |
| P(T <= t) two ways | 0.255069891 | |
| t-critical two ways | 2.776445105 | |

TABLE 25

| | 1.65M/50° C. | 1.65M/30° C. |
|---|---|---|
| Average | 100.1868395 | 96.9753881 |
| Variance | 0.156269663 | 2.49751325 |
| Observations | 3 | 3 |
| Pooled variance | 1.326891456 | |
| Estimated difference of averages | 0 | |
| va | 4 | |
| t statistics | 3.41451709 | |
| P(T <= t) one way | 0.013457696 | |
| t-critical one way | 2.131846786 | |
| P(T <= t) two ways | 0.026915391 | |
| t-critical two ways | 2.776445105 | |

DETAILED DESCRIPTION OF THE DRAWINGS

Some examples of processes using the present method are illustrated in the Figures. The Figures are not to be construed as limiting the claims.

FIG. 1 schematically illustrates a process according to an embodiment, directed to treatment of wastewater. In this process, the wastewater main stream 1 and precipitation agent 2 are added in a precipitation tank 3 including precipitation agent adding, rapid mixing and flocculation phases. The mixture 4 is then passed through a separation process like filtering 5, where the filtered wastewater 6 as a main stream is separated from the chemical sludge including precipitated phosphorus 7. The chemical sludge including precipitated phosphorus 7 is then passed to a dissolution tank 8, into which phosphoric acid 12*a* is added. The resulting liquid 9 is thereafter passed to an ion exchange process 10, wherein also a regeneration solution 11 is added. The product from the ion exchange process is a stream of phosphoric acid 12, that can be divided into two product streams, the stream 12*a* being re-circulated into the dissolution tank 8, and the surplus stream 12*b* being forwarded to other processes. The precipitation agent 2 is separated with a regeneration solution 11 and again re-circulated into the precipitation tank 3.

Figure 2:
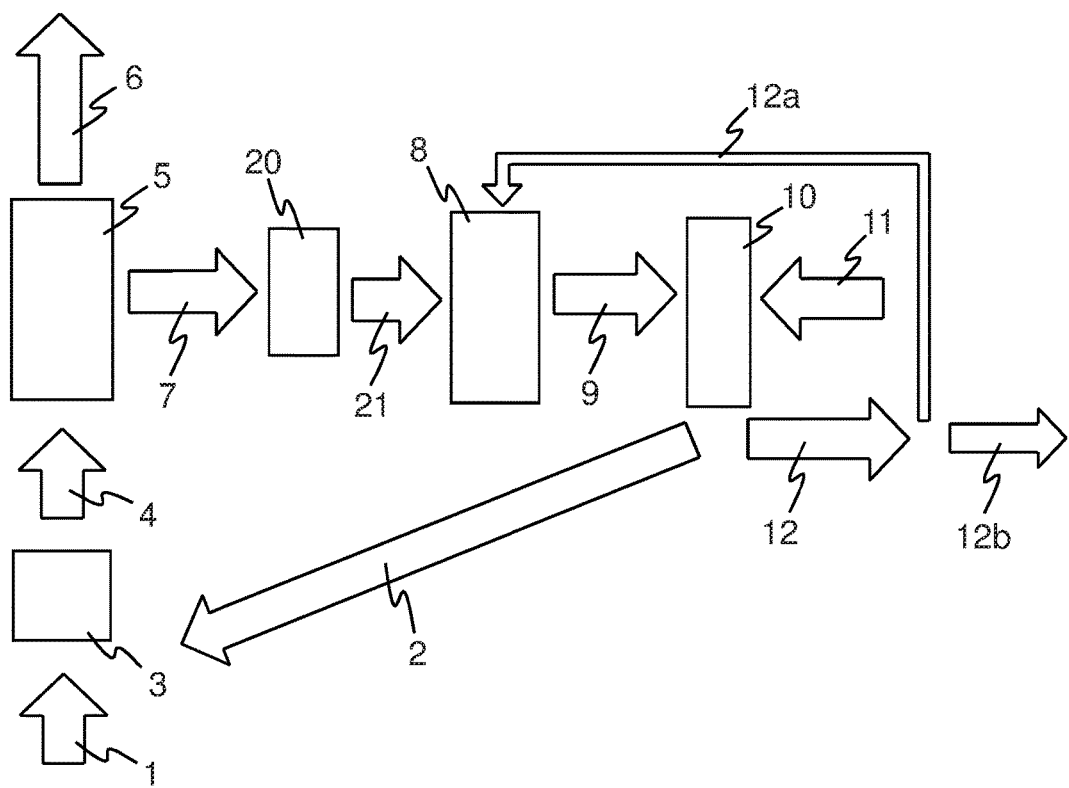
FIG. 2 schematically illustrates another process according to an embodiment.

FIG. 2 illustrates another process according to the present description, which is identical to that of FIG. 1, except that a concentration unit 20 is arranged to remove extra liquid from the precipitated phosphorus (i.e. the precipitate) 7 to form a concentrated chemical sludge 21. The concentrated chemical sludge is then passed onto the dissolution tank 8.

Figure 3:
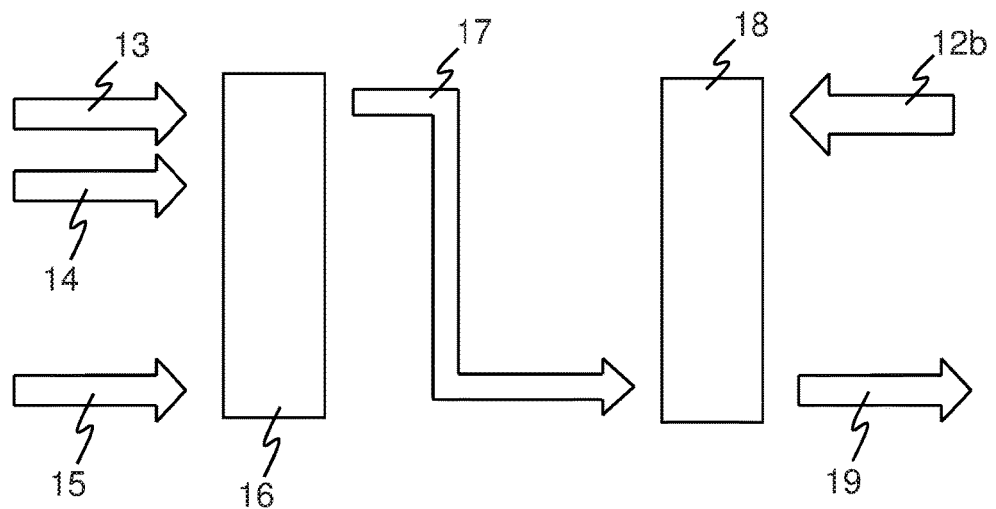
FIG. 3 schematically illustrates a further process according to an embodiment.

FIG. 3 schematically illustrates yet another process according to an embodiment. This second process can be added to the first process illustrated in FIG. 1 in case the digested sludge liquor i.e. reject water is available. In this process, sodium hydroxide 13 (or calcium hydroxide) and reject water 14 as well as air 15 are introduced to a stripper 16. The ammonia 17 that is separated into the air phase in the stripper 16 is forwarded to a washer 18, where it is washed with surplus phosphoric acid 12*b* and ammonium phosphate 19 is obtained.

The invention claimed is:

1. A method for removal and recovery of phosphorus, comprising
   a) a precipitation step for precipitating phosphorus from a liquid stream comprising at most 30 mg of phosphorus per liter and at most 50 mg of suspended solids per liter, using a precipitation agent, to form a precipitate,
   b) a first separation step for separating the precipitate from the liquid stream,
   c) a dissolution step for dissolving the precipitate in phosphoric acid to obtain a first solution, and
   d) a second separation step for separating the phosphoric acid and the precipitation agent.

2. A method according to claim 1, further comprising re-circulating at least part of the separated phosphoric acid into the dissolution step.

3. A method according to claim 1, wherein the liquid stream comprises 1-10 mg of phosphorus per liter and/or 5-20 mg of suspended solids per liter.

4. A method according to claim 1, further comprising a concentration step after the separation step b) to reduce a volume of liquid in the precipitate before the dissolution step c).

5. A method according to claim 1, further comprising re-circulating at least part of the precipitation agent into the precipitate formed in step a).

6. A method according to claim 1, wherein the precipitation agent is selected from the group consisting of aluminium sulphate Al2(SO4)3, ferric sulphate Fe2(SO4)3 and aluminium chloride AlCl3.

7. A method according to claim 1, wherein the first separation step is carried out by filtration, flotation or sedimentation.

8. A method according to claim 1, wherein the second separation step is carried out by an ion exchange process.

9. A method according to claim 8, wherein a regeneration solution comprising acid is used in the ion exchange process and un-reacted acid is recovered from the precipitation agent recovered in the second separation step.

10. A method according to claim 1, wherein the precipitation step is carried out at a temperature of 5-45° C.

11. A method according to claim 1, wherein the first separation step is carried out at a temperature of 5-45° C.

12. A method according to claim 1, wherein the dissolution step is carried out at a temperature of 10-80° C. and pH value of 3 or less.

13. A method according to claim 1, wherein the second separation step is carried out at a temperature of 10-60° C. and pH value of 3 or less.

14. A method according to claim 1, further comprising treating a nitrogen rich water in a stripper with a base at a pH of 9 or more, and washing the obtained ammonia with phosphoric acid to obtain ammonium phosphate.

15. A method according to claim 14, wherein the phosphoric acid is obtained from the second separation step d).

* * * * *